United States Patent
Cheung

(10) Patent No.: US 6,170,387 B1
(45) Date of Patent: Jan. 9, 2001

(54) APPARATUS FOR THE PRODUCTION OF HEATED BEVERAGE

(75) Inventor: Chun-Kong Cheung, Kowloon (HK)

(73) Assignee: Gee (HK) Company Limited, Kowloon (HK)

(*) Notice: Under 35 U.S.C. 154(b), the term of this patent shall be extended for 0 days.

(21) Appl. No.: 09/199,387

(22) Filed: Nov. 25, 1998

(51) Int. Cl.[7] .................................................. A47J 31/00
(52) U.S. Cl. ................................ 99/299; 99/283; 99/288
(58) Field of Search ............................. 99/283, 288, 293, 99/299

(56) References Cited

U.S. PATENT DOCUMENTS

| | | | |
|---|---|---|---|
| 3,356,010 | * 12/1967 | Eisendrath | 99/299 X |
| 4,287,817 | * 9/1981 | Moskowitz et al. | 99/293 X |
| 4,882,983 | * 11/1989 | Pastrick | 99/299 X |
| 4,911,067 | * 3/1990 | Oppermann | 99/299 |
| 4,969,392 | * 11/1990 | Steele et al. | 99/295 X |
| 5,515,771 | * 5/1996 | Smit | 99/299 X |
| 5,623,864 | * 4/1997 | Moore et al. | 99/299 X |

* cited by examiner

Primary Examiner—Reginald L. Alexander
(74) Attorney, Agent, or Firm—Jacobson, Price, Holman & Stern, PLLC

(57) ABSTRACT

This invention relates to an apparatus for the production of heated beverage being, in particular, coffee. The apparatus provides a brewing chamber in which the outlet from the brewing chamber is closed for a period during operation to ensure retention of the liquid in contact with the coffee. Upon opening of the outlet, the coffee progresses to a beverage container substantially sealed against the escape of steam and aroma from the brewed coffee.

12 Claims, 7 Drawing Sheets

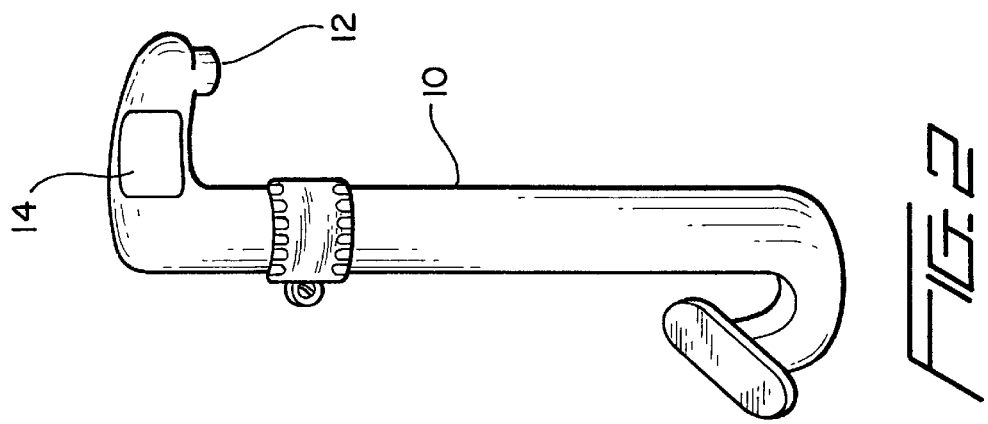
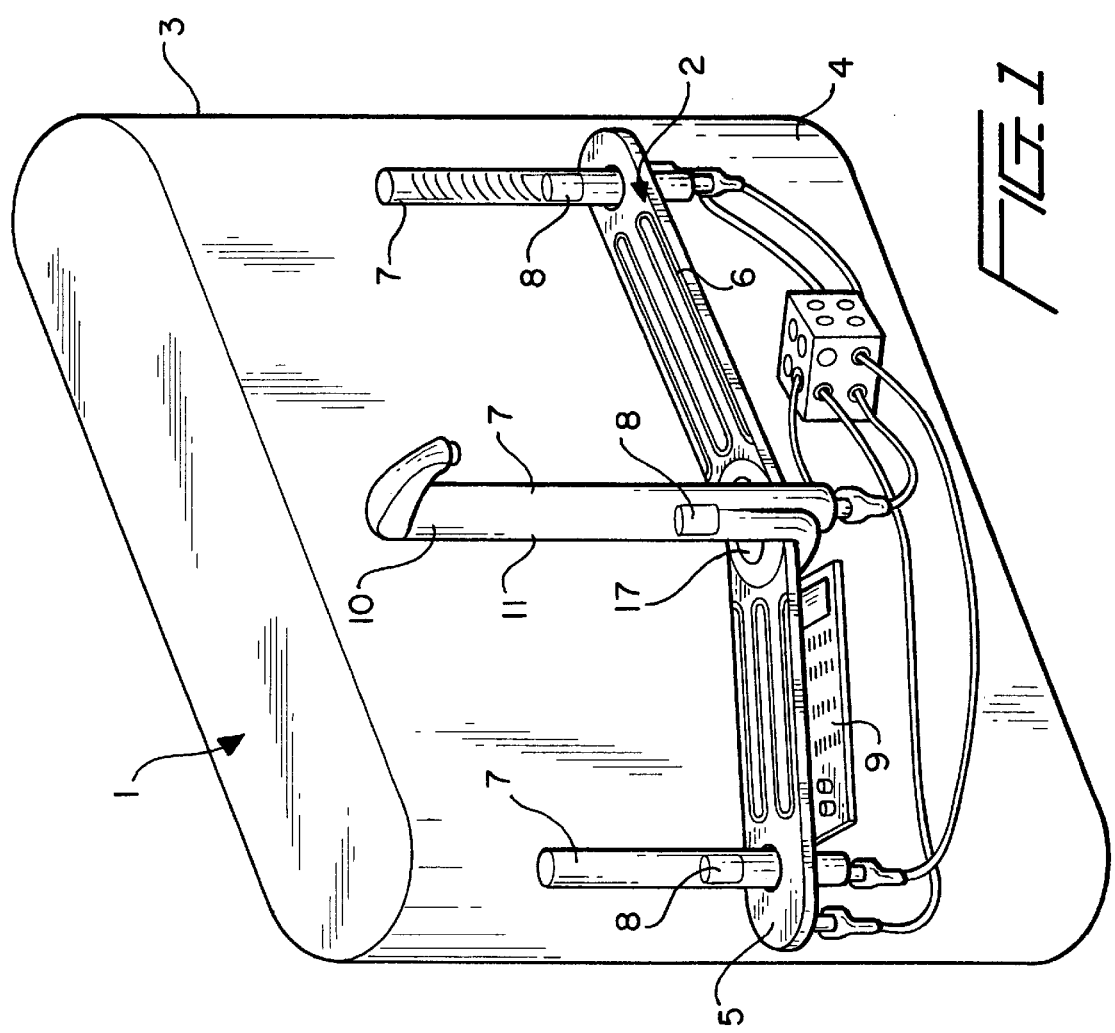

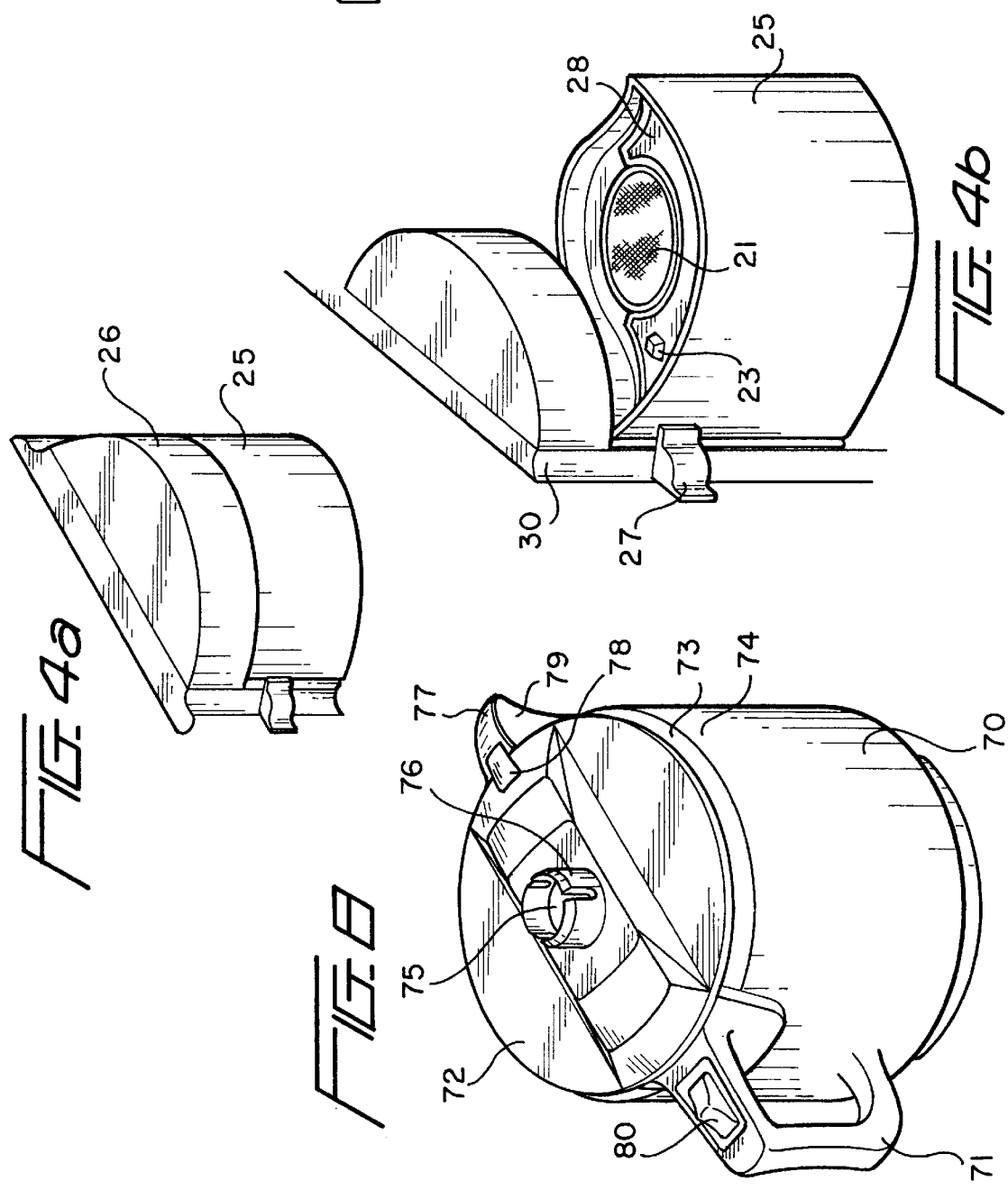

APPARATUS FOR THE PRODUCTION OF HEATED BEVERAGE

BACKGROUND

1. Field of the Invention

This invention relates to an apparatus for the production of heated beverage and, in particular, although not necessarily solely, an apparatus for the production of coffee. Other brewable beverages could be made in the same apparatus.

2. Description of the Prior Art

Existing coffee makers utilize filters containing coffee grounds. Typically, heated water is passed through the apparatus to a point above the filter and allow to drip onto the coffee grounds and percolate through the coffee. The contact time between the heated water and the ground coffee is dependent on the rate at which the water can percolate. Such a rate is dependent on the conditions of both the ground coffee and the filter and may vary considerably through different operations or even during a single operation of the apparatus.

The variability of percolation times can be affected by the condition of the coffee and filter during percolation. At the outset of introduction of the heated water, both the coffee and filter are dry and become increasingly more saturated throughout the operation. This can affect the degree to which the heated water is able to extract the coffee essence from the grounds and lead to variability in the coffee produced at the start of the process compared with that in the middle or end of the process.

If such typical coffee makers are used to try and produce small amounts of coffee, it would be expected that the coffee filter would need to contain less coffee grounds, However, the reduction in quantity of coffee grounds also decreases the percolation time leading to variability in the judgment of the quantity of coffee required. Further, due to the reduction in contact time, the grounds are used less efficiently.

Another common feature of existing coffee apparatus is that the coffee produced is supplied to a container sitting on a heated element with the container not being sealed such that steam and aroma may escape. By allowing steam carried aromatic compounds to escape the container, the taste of the coffee may be affected.

The heated plate on which such containers typically sit is required to regularly reheat the coffee. By allowing steam to escape, such a heating element is required to do more work leading to less efficient power consumption to maintain a reasonable coffee temperature. Furthermore, by allowing steam to escape, there is a gradual boiling off of the water. The resultant coffee left in the container becomes increasingly stronger and more bitter as time passes. Furthermore, the increased use of the heating element to maintain the coffee temperature can lead to burning of the coffee significantly reducing the quality of the taste of the coffee from the container.

OBJECT OF THE INVENTION

It is an object of the present invention to provide an apparatus for producing a heated beverage which overcomes or reduces one or more of the disadvantages of the prior art or at least provides the public with a useful choice.

SUMMARY OF THE INVENTION

Accordingly, in a first aspect, the invention may broadly be said to consist in an apparatus for production of a heated beverage including;

a first chamber fox receiving a liquid;

heating means within or in communication with said first chamber to heat said liquid;

a second chamber for receiving heated liquid from said first chamber or heating means and for the containment of a brewable essence;

a valve on the outlet of said second chamber;

beverage containing means for receiving brewed beverage from said outlet; and control means to control said valve to ensure retention of heated liquid in said second chamber in contact with said brewable essence.

Accordingly, in a second aspect, the invention may broadly be said to consist in an apparatus for the production of heated beverage including:

means for the production of a brewed heated beverage;

beverage containing means for receiving said brewed beverage; and sealing means to substantially seal said beverage containing means to reduce the escape of steam from said beverage containing means.

Accordingly, in a third aspect, the invention may broadly be said to consist in a valve for use in apparatus for the production of a heat beverage including:

an inlet end;

an outlet end;

outlet sealing to close said outlet in a first position and open said outlet in a second position;

a movable bearing surface which moves upon bearing against a beverage container;

engaging members between said movable bearing surface and said outlet sealing means to move said sealing means to said second position when said beverage container is in place;

biased inlet sealing means to close said inlet when said outlet sealing means is in said second position; and control means to open said inlet sealing means against said bias once desired operating conditions are met.

Further aspects of this invention may become apparent to those skilled in the art to which the invention relates upon reading the following description.

BRIEF DESCRIPTION OF THE DRAWINGS

The invention will now be described with reference to preferred embodiments which themselves are described with reference to the following drawings in which;

FIG. 1 shows a perspective view of a water tank and associated heat as part of a preferred embodiment of the invention;

FIG. 2 shows an elevational view of a heater tube forming a portion of FIG. 1;

FIGS. 4a, 4b, 4cand 4d show portions of the brewing chamber in accordance with a preferred embodiment of the apparatus;

FIG. 8 is a perspective view of a beverage container forming part of a preferred embodiment of the invention;

DETAILED DESCRIPTION OF PREFERRED EMBODIMENTS

Figure 3:
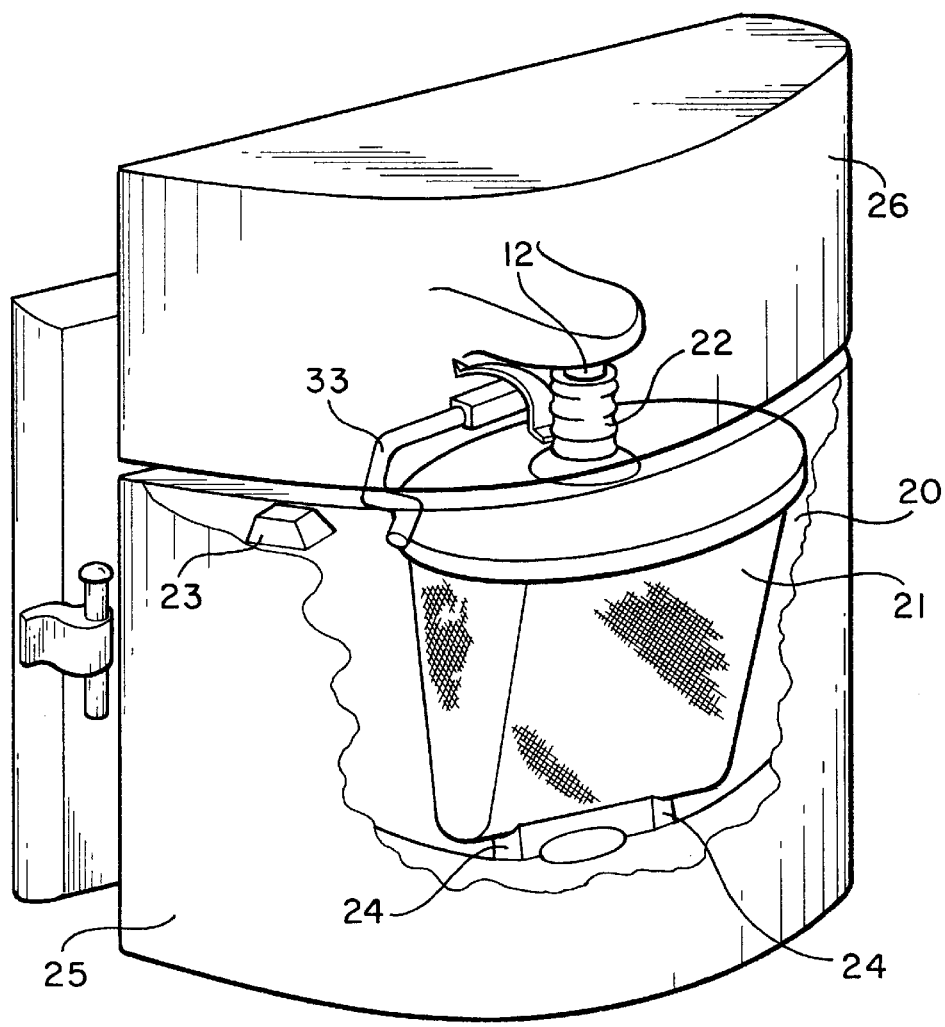
FIG. 3 shows a partial or sectional perspective view of a brewing chamber in accordance with a preferred embodiment of the invention.

This invention relates to an apparatus for the production of a heated beverage. The preferred embodiments will be described generally with reference to an apparatus for producing coffee. However, it should be appreciated that alternative brewable essence may be utilized in the invention other than coffee to much the same effect. Although variations may be required to adapt the apparatus or its operation for other brewable products, they may still employ aspects of this invention.

Referring to FIG. 1, a preferred embodiment of a first chamber 1 is shown. This first chamber is designed to contain the water or other liquid prior to healing and production of the beverage. As shown in FIG. 1, the water tank may be a container of any general shape to suit the overall apparatus having a water tight internal compartment.

A beating means 2 may be provided within or in communication with the water tank or first chamber 1. The heating means 2 as in this preferred embodiment is contained within the water tank to heat the entirety of the water contained therein. However, the heating means could comprise a heat receiving water from the water tank ad either passing the water back to the water tank to heat the entire contents or directing the water directly to an outlet for subsequent brewing of the beverage.

Again referring to FIG. 1, this preferred embodiment of the invention contains the heating means 2 which forms at least a part of the base of the liquid chamber 1. An outer housing 3 may contain the liquid chamber 1 as only a part of the overall section and this particular embodiment seals the base of the liquid chamber with base portions 5 carrying various heating elements 6. Such an arrangement provides a waterproof base 4 beneath the water tank for various electronics or controls of the heaters.

Aside from the heating elements in the base 6, this particular embodiment provides heater tubes 7 spaced throughout the tank to assist in heating the water within the water tank. These heater tubes may comprise sealed tubes carrying electrical coils or similar heating means within and may include thermostats 8 for control of the heating elements in conjunction with a control means 9. This preferred embodiment provides time relays and a timer program to control the heaters.

Referring additionally to FIG. 2, the central tube 10 may comprise a dual tube carrying both a heating element 7 on one side and an outlet tube 11 on the other. The outlet tube 11 may terminate at an outlet 12 for the supply of heated water to the subsequent brewing chamber.

The outlet tube 11 may include a steam pressure valve 14 to ensure that the heated water has reached an adequate temperature prior to being able to progress to the outlet 12.

Figure 11:
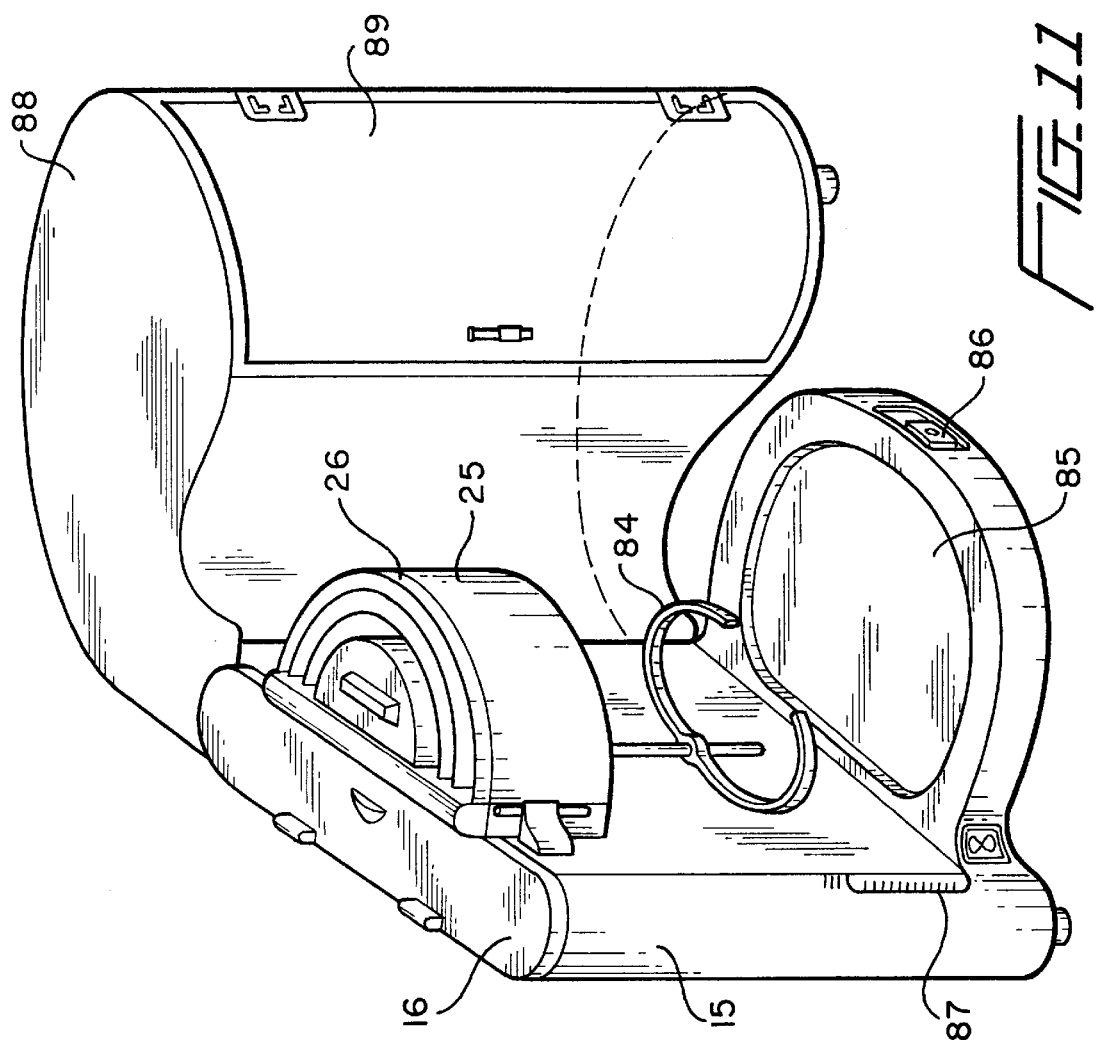
FIG. 11 is a perspective view of an overall preferred embodiment with the beverage container removed.

Overall, the water tank is shown in FIG. 11 as item 15 having a lid 16. When desired the lid 16 may be lifted and water introduced to the water tank. Heating elements 6 in the base and/or any internal or other heating elements such as heater tubes 7 may be utilized to heat the entire water within the tank. It may be preferred that the water within the tank is left just below boiling point to reduce steam build up in the water tank and the additional heating of water can be conducted as water progresses through an outlet 17 from the tank 1 into the outlet tube 11. The associated heating element 7 housed within that central tube 10 can provide the additional heating to reach boiling point of the water and open the steam pressure valve 14. Then water may pass to the outlet 12 and towards the brewing chamber discussed later.

Referring to FIG. 3, the outlet 12 is shown to introduce the heated water or liquid into the brewing chamber 20. The brewing chamber 20 may include a filter or other container 21 for containing the brewable essence such as coffee grounds or similar material. The provision of the filter is dependent upon the nature of the material being brewed. For example, should the apparatus be adapted for use in brewing tea, tea bags rather than a coffee filter could be utilized.

In this preferred form, the outlet 12 is connected to the coffee filter or similar 21 and the brewing chamber 20 as a whole through the provision of a communicating tube 22. In this preferred form, the communicating tube 22 comprises an elastic material such as rubber or similar to deform over the outlet 12 and provide a connection to the filter 21 and chamber 20 which minimizes loss of heat from the water passing through.

While still referring to FIG. 3, it should be noted a button 23 is provided on an upper surface of the housing containing the brewing chamber 20 and the coffee filter 21. This button or other switch may be connected to supporting rods 24 beneath the coffee filter 2, and upon operation, lift the coffee filter from its nested position within the chamber 20. Other apparatus to assist in the removal of the filter can be provided and designed as desired.

FIGS. 4a to 4d show the brewing chamber 20 and its associated housings in various positions. Referring firstly to FIG. 4a, that portion of this preferred embodiment can be seen to have an outer housing 25 around the brewing chamber 20 and an upper housing 26 which surrounds the heated water outlet 12 from the water tank. In this preferred arrangement, the water tank is positioned directly behind the brewing chamber.

Referring to FIG. 4b, to be seen that the brewing chamber 20 is pivotally connected to the main body portion 30 of the apparatus. This may be provided through hinged connections 27 as shown. This pivotal connection allows easy access to the brewing chamber 20 and filter 21 when it is desired to remove the filter to change the coffee grounds. An upper surface 28 may be provided inside the housing 25 in which the coffee filter 21 may sit and containing the ejector button 23 discussed previously. The upper surface 28 may substantially seal around the coffee filter 21 to ensure that all the hot water supplied to the brewing chamber is initially passed into the filter 21. This may not strictly be required in all cases as it may be sufficient to simply retain the water within the chamber 20 and have a container 21 holding the brewable essence anywhere in communication with that chamber.

Referring to FIG. 4c, the partial cross section view through this portion of the device is shown. The filter 21 is shown sitting within the upper surface 28 and progressing into the chamber 20 to hold the liquid being brewed. An outlet 29 may be provided at the base of the second chamber 20 for the outlet of the brewed beverage.

FIG. 44 shows a lid or cover 31 which may be used over the filter 21. This lid or cover ensures the retention of heat in the hot water contained within the second chamber 20 and is preferably provided with sealing means 32 such as a rubber layer or similar to retain steam and heat within the chamber 20. Passage of the heated water from the outlet 12 from the water tank to the filter 21 and second chamber 20 can be through the connecting tube 22 discussed previously provided on the lid 31.

Figure 5:
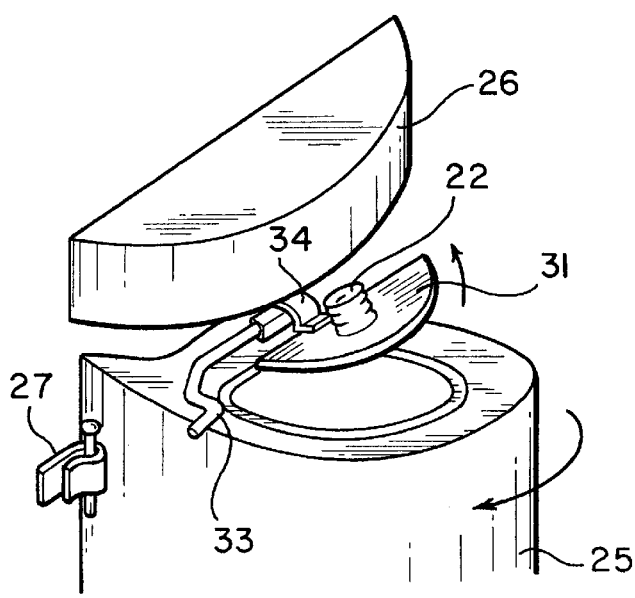
FIG. 5 shows a perspective view of the brewing chamber and associated housing in accordance with a preferred embodiment of the apparatus.

Referring to FIG. 5, a convenient means is shown for lifting the lid 31 as the housing 25 is rotated to its open position for access to the filter 21. As the housing 25 is rotated around its hinge 27, an angle hinge 34 connected to the lid 31 may be rotated to lift the lid 31. As shown in FIG. 3, rotation of the housing 25 may cause the protruding rod 33 to bear on the inside of the housing 26 surrounding the hot water outlet 12. Pressure on the rod 33 may cause the hinge 34 to rotate backwardly to lift the lid 31 as shown in FIG. 5.

Figure 6:
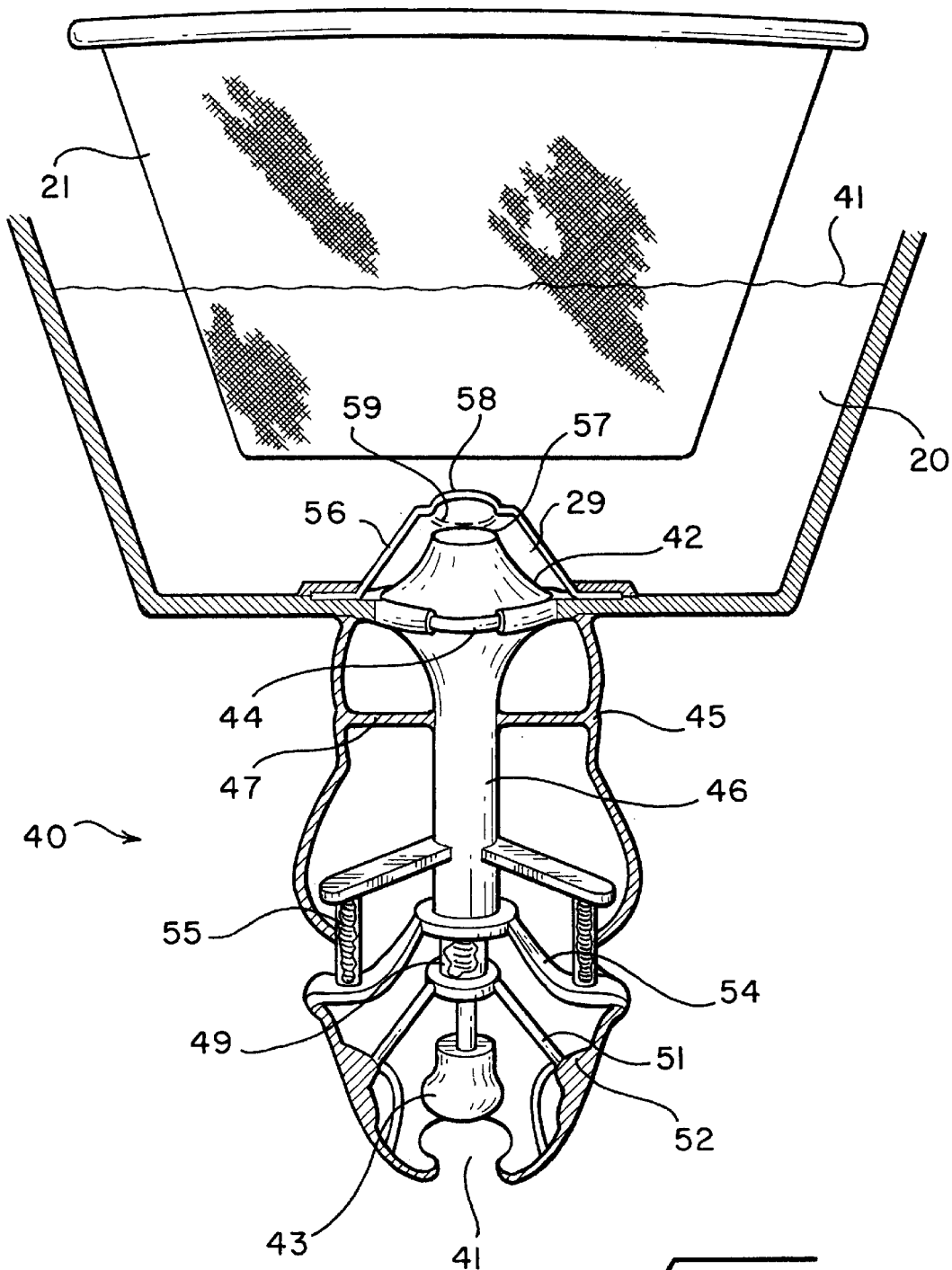
FIG. 6 is a cross sectional view through the brewing chamber and outlet valve in accordance with a preferred embodiment of the apparatus.

Referring to FIG. 6, a cross sectional view through the chamber 20 and a valve 40 within its outlet 29 is shown. As can be seen in FIG. 6, it is intended that the outlet 29 remain closed to provide some retention of liquid within the chamber 20 in which the brewable essence is contained. The coffee filter 21 is shown within the chamber 20 and a representative liquid level 41 is indicated. Of course, the coffee filter could be almost fully immersed or only partially immersed as shown.

The valve 40 closing the outlet 29 will now be discussed in detail. It is to be noted that this is a preferred valve construction and a variety of alternatives may exist.

The valve 40 contains an outlet end 41 and an inlet end 42 (also forming the outlet 29 from the chamber 20). Both ends 41 and 42 of the valve 40 are capable of being sealed through the provision of outlet sealing mean 43 and inlet sealing means 44.

The valve 40 may be provided with an outer valve casing 45. Within the casing 45 is a central shaft 46. Connecting supporting members 47 may be of deformable or flexible metals to allow movement of the shaft 46 over a limited range of movement.

The outlet 41 from the valve 40 comprises an aperture within a outlet housing 48. The bulbous end 43 of the central shaft may act as the sealing means to seal against the perimeter of the outlet aperture 41. This sealing means 43 may be biased towards closure of the outlet either by gravity or, as shown in this preferred embodiment, a biasing means such as spring 49.

The outlet biasing 48 may be provided in deformable or flexible materials. It may include a bearing surface being the outer surface 50 which bears against cooperating surfaces provided on a beverage container used to collect the brewed beverage. As shown in this preferred example, constriction of the deformable or flexible portion 48 through contact of the bearing surface 50 on the inner sides of a receiving portion on the beverage container will cause the lifting arms 51 to lift the sealing means 43 against the biasing action of the spring 49. It can be seen that the lifting arms 51 are provided as 2-part arms having an intermediate hinge 52. The lower portion of the arm 53 is provided to support the hinge 52 and the arm 51 within the housing.

At the same time as deformation of the outlet housing 48 causes lifting of the sealing means 43, it may also lift the shaft supporting arms 54 to lift the overall central shaft 46. It will be noted that the biasing means in the form of spring 55 are provided intermediate of the lifting arms 54 and the central shaft 46. This lifting action passed through the biasing means 55 lifts the inlet sealing means 44 to seal the inlet 42.

Control means 56 are provided to, once desired operating conditions have been reached within the chamber 20, push the sealing means 44 and the central shaft out of its closed position in the inlet 42 and against the biasing action of these springs or other biasing means 55.

The control means 56 and its operation can be provided by a variety of means. In this preferred example, the action is provided by a thermo-metal spring over the top 57 of the central shaft 46. The active portion 58 of the thermo-metal spring is shown in a raised position initially and, through the dotted lines 59, in the position it assumes once a desired temperature has been reached of the thermo-metal. In the second position 59, the thermo-metal spring bears directly on the top 57 of the shaft 46 to dislodge the sealing means 44.

The provision of such a control means relies on the temperature of the liquid within the container 20 to slowly raise the temperature of the active portion 58 so that it may deform into a second position 59. This time for the thermo-metal spring to activate provides the retention time necessary for the liquid in contact with the coffee. Alternative control means could be provided to open the outlet directly after a specified time interval or, alternatively, could be provided to progressively open the outlet to maintain a specific fluid level within the chamber 20. The parameters on which the control are provided can be determined to best suit the production of the particular beverage. Similarly, the active mechanism to open the outlet 29 from the chamber 20 may vary in accordance with those desired operating conditions.

Figure 7A:
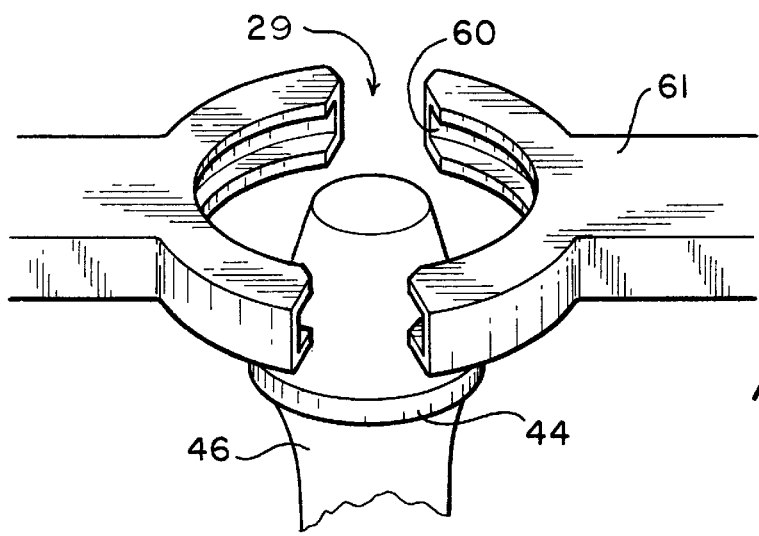
FIGS. 7a and 7b show perspective views of the inlet end of the valve shown in FIG. 6.
Figure 7B:
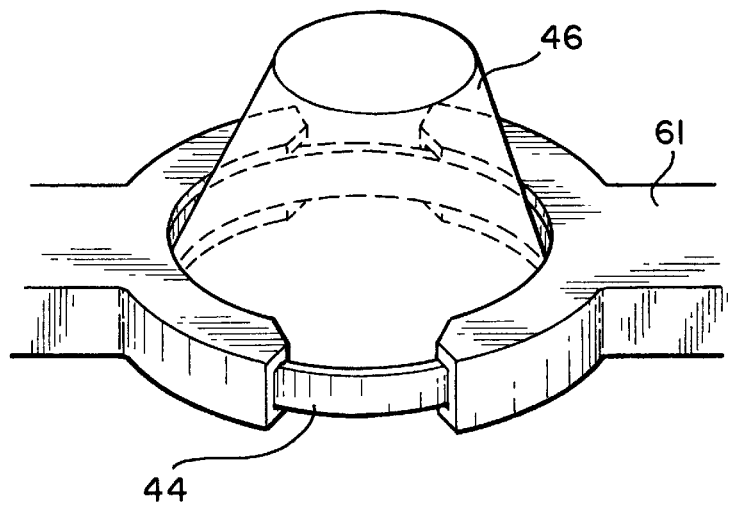

Referring to FIGS. 7a and 7b, the inlet to the valve 40 is shown in greater detail. It can be seen that a slot 60 is provided in the base housing 61 of the chamber 20 to engage with the sealing means 44 and close the aperture 29. The sealing means 44 and associated shaft 46 are shown in the open position in FIG. 7a and in the closed position in FIG. 7b.

Referring to FIG. 8, a brewed beverage container 70 is shown. This container may sit beneath the valve 40 from the brewing chamber to receive the brewed beverage.

The container 70 may comprise a main body portion being a substantially waterproof vessel. An associated handle 71 may be incorporated on an outside portion for lifting and pouring of the beverage.

A lid 72 is provided to substantially enclose the upper surface of the container 70. A sealing means 73 in the form of a rubber layer may be attached to the perimeter of the lid 72 or the upper edge of the walls 74 forming the container 70.

The lid 72 may have an inlet 75 to receive the brewed beverage. Upwardly extending walls 76 around the inlet 75 are provided to engage and cooperate with the deformable housing 48 at the outlet end of the valve 40. This provides a substantial seal against the escape of steam from the container 70.

A simple pivotally connected cover 77 may be provided over the spout 79 to provide some sealing in that region if desired. A hinge 78 may allow the cover 77 to open as the container 70 is tilted to pour beverage from the container.

As the lid 72 is designed to seal tightly to the walls 74 of the container 70, there is a risk that some suction may be created within the container 70, particularly if the beverage within the container 70 is allowed to cool. Therefore, a simple slide switch or similar means 80 is provided which may activate means to bear on the lid 72 and break the initial seal which may be created through the vacuum caused by the cooling liquid and air.

Figure 9:
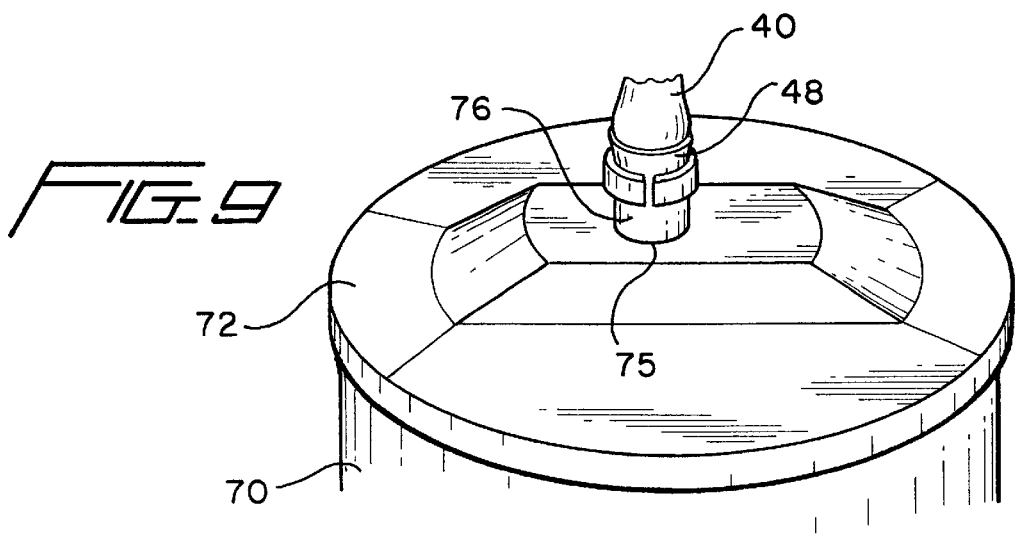
FIG. 9 shows a perspective view of the connection between the outlet valve of FIG. 6 and the beverage container of FIG. 8.

FIG. 9 shows a close-up of the valve 40 and the deformable outlet housing 48 in communication with the upwardly depending walls 76 surrounding the inlet 75 into the container 70. It can be seen that the wall 76 may provide an upward and inward pressure on the deformable housing 48 as required to open the valve.

Figure 10:
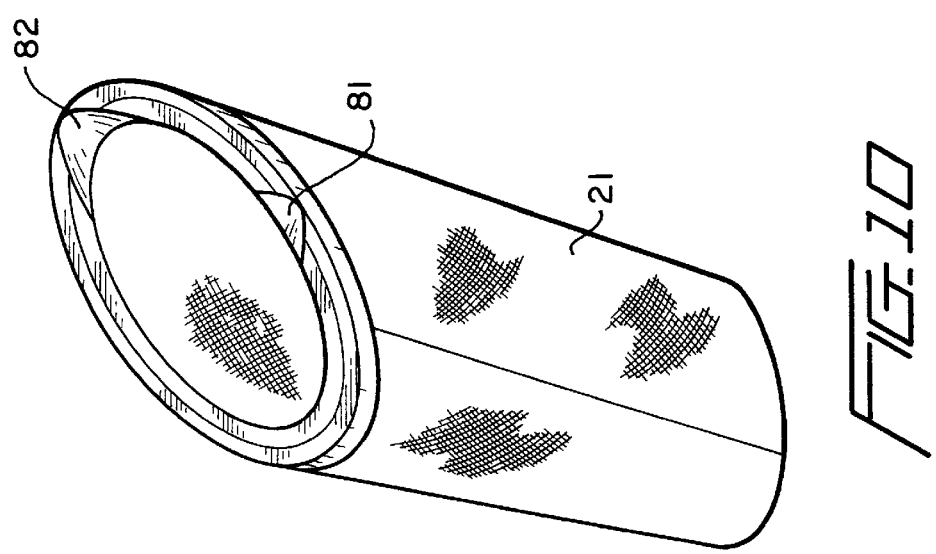
FIG. 10 is a perspective view of a filter forming part of the brewing chamber of a preferred embodiment of the invention.

FIG. 10 provides a further view of the coffee filter 21. The coffee filter 21 may be made of a permeable material with the apertures in the material being sized to suit the form of brewable essence held within. Either fine ground or coarse ground coffee may be incorporated and the type of filter changed to suit the grade of material held within, An additional sealing means 81 may be provided around the upper surface of the filter 21 to seal the filter in its position against the upper surface 28 of the brewing chamber 20. A protrusion 82 may be provided adjacent the upper surface of the filter 21 to be gripped within the thumb and forefinger of the user to lift the filter to either empty, refill or wash the filter.

Referring to FIG. 11, the overall apparatus is shown with the beverage container 70 removed for simplicity. The water tank housing 15 and lid 16 are shown together with the casings 25 and 26 for the brewing chamber and outer housing around the water tank outlet.

Below the brewing chamber 20, the container 70 would normally reside within a holder 84 as shown to support the container 70. A heating element 85 is placed in the base to be controlled by a heating element (not shown) and control means (not shown) to keep the desired temperature within the container 70. A switch 86 may be provided together with an indicating lamp showing operation of the device. Furthermore, a water level indicator 87 may be provided for the water tank.

It should be noted that the heating element 85 in this preferred embodiment is considerably larger than the base of the beverage container 70. The additional area provided on the heating element 85 can be used to heat food or other items to be had with the beverage.

A cabinet 88 may form part of the overall apparatus or can be an attachable extra if desired. This may contain a door 89 into the cabinet 88 for the storage of consumables used with the beverage maker.

Figure 12:
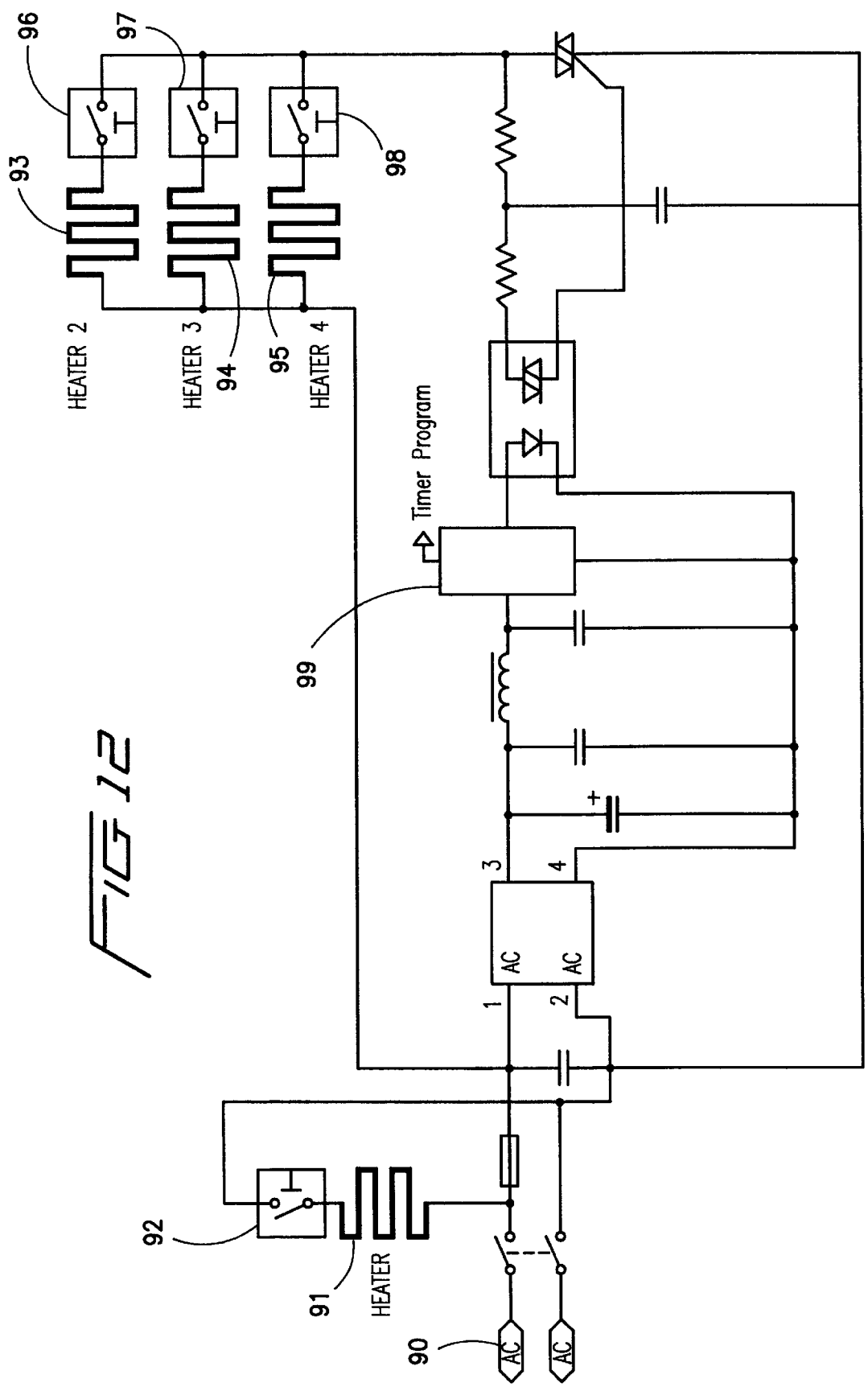
FIG. 12 shows a possible circuit diagram for the water tank heating elements of the preferred embodiment shown in FIG. 1

Referring to FIG. 12, a preferred embodiment of a circuit diagram is shown. Upon provision of power across the poles 90 of the apparatus, the heater 91 provided in the base below the beverage container may be activated. An associated thermostat 92 may control the temperature of this heated surface.

Additional heating elements 93, 94 and 95 and associated thermostats 96, 97 and 98 are provided within the water tank to heat the water. This may be controlled through a timer program provided in a suitable control means 99.

The overall apparatus may utilize a number of materials being normal materials used in the production of such apparatus. The majority of components may need to be heat resistant and heat resistant plastics or even glass may be used for such items as the beverage container. Where sealing is required against heated liquid, materials which will not perish readily at elevated temperature should be utilized.

In operation, it can be seen that water can be supplied to the water tank and heated. The heated water as then gradually fed into the brewing chamber 20. The brewing chamber 20 contains the brewable essence to make the beverage. The outlet from the container 20 is controlled to ensure some retention of liquid in the chamber 20 during the brewing process. This is provided by the value at the outlet from the brewing chamber 20.

Once the brewed beverage is completed and the outlet open, the beverage passes into a beverage container 70 substantially sealed against the escape of steam. This retains the heat and flavour within the container 70. The container 70 may sit on a further heating element to maintain the temperature as required.

Thus it can be seen that the overall apparatus for the production of a brewed beverage is provided with some advantages over the prior art.

The invention has been described with reference to preferred embodiments. Individual integers introduced in the description are deemed to include equivalents where appropriate as may be perceived by those skilled in the art to which the invention relates. The description is provided to describe a particular preferred embodiment and should not be considered limiting to the overall scope of the invention as defined in the appended claims.

What is claimed is:

1. An apparatus for production of a heated beverage comprising:

a first chamber for receiving a liquid;

heating means within or in communication with said first chamber to heat said liquid;

a second chamber for receiving heated liquid from said first chamber or heating means and for the containment of a brewable essence;

a valve on an outlet of said second chamber, wherein said valve on the outlet of said second chamber includes an inlet end;

an outlet end;

outlet sealing means to close said outlet in a first position and open said outlet in a second position;

a movable bearing surface which moves upon bearing against a beverage container;

engaging members between said movable bearing surface and said outlet sealing means to move said sealing means to said second position when said beverage container is in place;

biased inlet sealing means to close said inlet when said outlet sealing means is in said second position;

said control ensures retention of heated liquid by opening said inlet sealing means against said bias once desired operating conditions are met;

beverage containing means for receiving brewed beverage from said outlet; and control means to control said valve to ensure retention of heated liquid in said second chamber in contact with said brewable essence.

2. An apparatus for production of a heated beverage as claimed in claim 1 wherein said control means comprises a portion of thermo-metal to open and close said valve in accordance with the temperature of the portion of the thermo-metal resulting from the presence of heated liquid in said second chamber.

3. An apparatus for production of a heated beverage as claimed in claim 1 wherein said second chamber includes a filter for the containment of said brewable essence within said chamber.

4. An apparatus for production of a heated beverage as claimed in claim 1 wherein said apparatus further includes heating means positioned beneath said beverage containing means to maintain heating of said beverage after production.

5. An apparatus for production of a heated beverage as claimed in claim 4 wherein said heating means includes an additional area beyond that on which the beverage containing means resides for the heating of food.

6. An apparatus for production of a heated beverage as claimed in claim 1 wherein said apparatus further includes an attachable cabinet for the containment of consumables used in beverage production.

7. An apparatus for the production of a heated beverage as claimed in claim 1 wherein said beverage containing means comprises a base portion, upwardly extending walls about a perimeter of said base portion and an at least partially detachable lid.

8. An apparatus for the production of a heated beverage as claimed in claim 7 wherein the sealing means comprise a seal of flexible material about the perimeter of said at least partially detachable lid.

9. An apparatus for the production of a heated beverage as claimed in claim 1 wherein said beverage containing means includes a spout for the pouring of beverage from said beverage containing means and said sealing means includes a movable closure over said spout.

10. An apparatus for the production of heated beverage as claimed in claim 1 wherein said control means comprises a portion of thermo-metal to open said inlet sealing means once said thermo-metal portion has reached a desired temperature.

11. An apparatus for the production of a heated beverage as claimed in claim 1 wherein said outlet sealing means are biased to said closed position and said engaging members move said outlet sealing means against the action of said bias.

12. An apparatus for the production of a heated beverage as claimed in claim 1 wherein said movable bearing surface comprises a portion of deformable or flexible material against which a beverage container may reside.

* * * * *